Patented Feb. 1, 1938

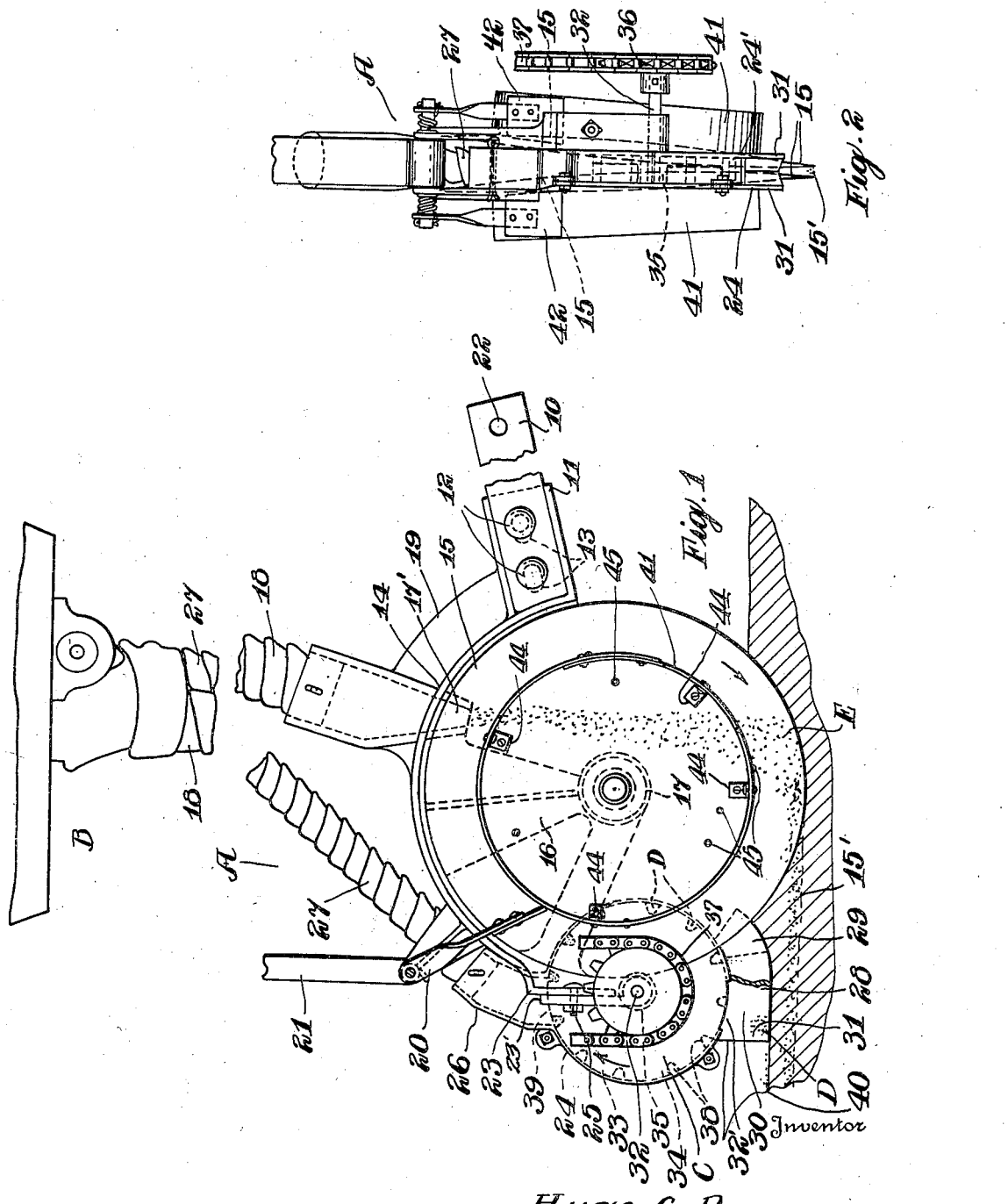

2,106,901

UNITED STATES PATENT OFFICE 2,106,901

SEEDER

Hugo C. Rassmann, Beaver Dam, Wis.

Application May 24, 1934, Serial No. 727,254

5 Claims. (Cl. 111—34)

This invention relates to a hill dropping beet seeder wherein it is desirable to provide a means for holding the seed to be sown in pockets close to the ground owing to the light weight character of the seed, and where it is necessary to provide a positive means of dropping the seed so that the hills will be comparatively equally spaced apart.

It is a feature to provide a rotor with pockets of sufficient size to hold the number of seeds for each hill. The pockets are spaced apart in the rotor and are constructed so that the seeds are dropped at intervals being operated in connection with a disc or a double disc boot. This rotor picks up the desired number of seeds into the respective pockets from the seed feeding tube and carries the seeds around into dropping position. The rotor is spaced closely adjacent the ground so that the seeds only need to drop a very short distance from the rotor. Thus I am able to provide a hill dropping beet seeder which is particularly adapted to beet seeds which are light in weight and provides a means of seeding in hills the beet seeds, each hill being uniformly spaced apart which is very desirable and so that the beets may be more readily harvested.

It is also a feature to provide the rotary seeder device with the pockets for the seeds therein constructed in a manner so that the rotor is in a vertical position, permitting the seeds to freely drop out of the pocket directly onto the ground. This placing of the rotor vertically provides a means whereby the seed dropper may be placed as close to the disc or discs as possible, and in fact may be positioned partially between the discs when a pair of discs are used so as to obtain the desired result in dropping the seed.

A further feature resides in providing a fertilizing means which is designed to impregnate the ground as the seeder passes along the same with the fertilizer in advance of the dropping of the seed in hills and in the manner as herein specified. The seeder operates to open a furrow of ground and deposit the fertilizer in the open furrow between the discs. The rotor may be adjusted in relation to the ground. The depth of the furrow may be regulated by the adjustment of the beets upon the same.

My hill dropping seeder is very desirable for seeding beets and may also be used for the seeding of any other kind of seeds where it is desirable to accomplish the same result and where the seeds are light in weight and it is necessary to place the rotor of the seeder close to the ground. With this construction of seeder I am able to provide a positive seeding means which is so desirable in the seeding of beets.

In the drawing forming part of this specification:

Figure 1 is a side view of my hill dropping seeder.

Figure 2 is an end view of the same.

My seeder A is provided with a draw-bar 10 which is adjustably connected to the bracket 11 by the bolts 12 which engage through the slots 13. The seeder A is formed with an arcuated frame portion 14 which extends over the discs 15 and which is provided with a central depending bearing bracket 16 having a bearing portion 17 for the pair of discs.

The discs 15 are angularly disposed as illustrated in Figure 2 so as to provide a narrow furrow opening 15' in the ground over which the discs travel. In mounting the discs 15 in this manner a wider opening is formed in the top of the discs than at the bottom. Thus a substantial space is provided between the discs at the top to receive the bearing bracket 16 and also to receive the discharge nozzle 17' through which the fertilizer drops from the flexible connector 18 which connects with a source of fertilizer supply. A reinforcing rib 19 extends between the draw-bar bracket 11 and the nozzle 17' to provide a strong construction to the frame 14 of the seeder A.

The rear portion of the frame 14 is adapted to be adjustably connected through the bracket 20 formed projecting from the frame 14 to an adjusting link 21, only a portion of the element 23' and which is illustrated, and which leads to an operating lever on the frame supporting the hopper box B for the seed and the fertilizer. The operating lever is also not shown in the drawing. It is also apparent that the draw-bar 10 is connected through the eye 22 to a suitable portion of the frame which supports the box B and which is not illustrated in the drawing.

The rear portion of the frame 14 is formed with a depending bracket 23 to which the housing 24 for the seeder rotor C is adjustably secured by means of the bolt 25. The housing 24 provides an inclosure for the rotor C and is vertically disposed extending between the rear portion of the discs 15. The housing 24 is formed with a seed inlet tubular portion 26 into which the flexible tube 27 connects to direct the seeds from the hopper B to the rotor C.

The housing 24 is formed with a forwardly disposed furrow opener 28 having a tapered pointed nose portion 29 which projects into the ground sufficiently to open a furrow for receiving the seeds D from the rotor C. The furrow opener 28 is formed with a seed discharging slot 30 between the sides 31 of the same so that the seeds D may drop from the rotor through the opening 32' formed in the bottom of the housing 24. The rotor C is mounted rotatable on the shaft 32 in the sides of the housing 24 and is formed with a rim portion 33 which is of a width to fit between the walls of the housing 24. This rim portion 33 is connected by the web 34 to the central boss portions 35 which support the rotor C on the axle 32. The shaft 32 is adapted to be driven by the sprocket 36 and a suitable chain 37 which leads from a driving part of the wheels which support the box B and which are not shown in the drawing. One wall 24' of the housing 24 is removable.

The rotor C is formed with seed receiving pockets or recesses 38 and is adapted to be rotated in the direction of the arrow illustrated in Figure 1, so that as these pockets pass the opening 39 in the tubular portion 26, the seeds D coming through the feed pipe 27 fill into the pockets 38 and are carried around to the discharge opening 32', and pass through the discharge slot 30 to the bottom of the furrow 40 made in the ground by the furrow opener 28. As the seeder A passes on along the ground, the furrow 40 automatically closes over the hills of seeds D. The seeds D are dropped in hills into the furrow 40 as illustrated in Figure 1, as the seeder A passes along over the ground. In advance of the dropping of the seeds and below the same, the discs 15 make a fertilizer furrow 15' into which the fertilizer E is dropped from the nozzle 17', as illustrated in Figure 1, and the furrow 15' being narrow as illustrated in Figure 2, readily closes aided by the pressure of the disc bearing drums 41 which are mounted on the outside of the discs 15. Thus the furrow 15' is closed before the furrow 40 is made and the hills of seeds D are dropped into the same. This places the hills of seeds D in a separate furrow in the ground above the fertilizer where no burning or harm can come to the seeds from the fertilizer E deposited in the furrow 15'.

The bearing drums 41 are adjustably secured to the outside of the discs 15 so that they can be made larger or smaller in diameter to vary the depth that the discs 15 penetrate the ground in the operation of the seeder A. I provide suitable spring urged scrapers 42 for each of the bearing drums 41 which keep them clean of any dirt in their rotation over the ground.

In the operation of the seeder A it is pulled along by the draw-bar 10 over the ground and is adjusted by the link 21 coming from an adjusting lever which is not shown in the drawing. The lever raises and lowers the link 21 to raise and lower the seeder A in relation to the ground. As the seeder A travels along the ground, the discs 15 form the fertilizer furrow 15' which is comparatively narrow and which will quickly and readily close up to cover the fertilizer E. The fertilizer is carried from the flexible connecting tube 18 out of the nozzle 17' and between the discs 15 into the furrow 15'. The discs 15 act as shields to carry the fertilizer directly down to the bottom of the furrow. The nozzle 17' may be placed closer to the ground if it is desired.

As the seeder A travels along over the ground, the rotor C is rotated in a clockwise direction viewed as in Figure 1, and the seed pockets or recesses 38 pick up a sufficient number of seeds to make up the seed hills D. As the rotor C revolves the seeder A is drawn forward by the draw-bar 10 and the seed hills D are dropped, spaced apart at the desired intervals in accordance with the rotation of the rotor C, the spacing apart of the pockets 38 in the rim 33 and the speed of the travel of the seeder A. It is apparent that the pockets 38 may be made in any form desired or may be formed by a groove in the rotor C.

It will also be apparent that my seeder A is particularly adapted to discharge the desired number of seeds to provide a hill in planting beets in hills, with each hill properly spaced apart. Beet seeds are light in weight and ordinarily are hard to seed with old types of seeders, and obviously any seeds of the same character may be more readily seeded in the ground by using my seeder A, owing to the fact that the rotor C is closely spaced to the ground in preference to having a seeding element spaced from the ground as has been the old practice. My seeder A which is provided with pockets is adapted to drop the seeds at intervals in connection with a single disc or a double disc boot as shown, and I believe this construction is an advance in the art of handling light seeds of the character set forth.

My seeding rotor may be positioned within two or three inches of the ground or closer, if desired, and is unlike old forms of seeders. Further the rotor is vertically disposed, giving the advantage of positioning the rotor as closely as possible to and between the discs.

It is apparent that the pockets may be increased or decreased in number in the rotor and may vary in size, and the driving sprocket 36 may be so proportioned as to give the desired spacing of the hills depending on the seeds being sown or if it is desired to sow certain types of seeds in a continuous row. The depth at which the seeds can be planted may be adjusted by the adjustment of the rotor housing and by increasing or decreasing the diameter of the bearing bars on the disc means. Thus I provide a simple and effective seeder means for handling light weight seeds and I have found the same to be particularly adapted in the seeding of beets in hills equally spaced apart.

In accordance with the patent statutes I have described the principles of my seeder and it is obvious that the same may be varied within the scope of the following claims without departing from the purpose and intent of the invention.

I claim:

1. A seeder including, a pair of inwardly slanting discs, a fertilizer tube leading between said discs to feed fertilizer to the bottom of the furrow made in the ground by said discs, a rotatable seed dropper including a series of seed receiving pockets positioned between the rear portion of said discs and having a furrow opener means, and means for rotating said seed dropper.

2. A hill dropping seeder comprising, a furrow opener comprising a pair of spaced discs in angular relation to virtually come together at one point, a disc supporting frame between said discs having a seed passageway and a discharge opening therethrough, a seed receiving rotor in said supporting frame between said seed passageway and said discharge opening having seed pockets spaced apart therein, means for feeding seeds to the pockets of said rotor, means for rotating said rotor to discharge seeds in hills through said discharge opening.

3. A seeder including a pair of discs, means spacing said discs angularly disposed and close together at the lower edge of said discs, ground engaging means variable in diameter on said discs for regulating the depth of the furrow made by said discs, a seed receiving rotor on said spacing means adjacent said discs and behind the same having a series of seed pockets formed therein, and means for mounting said seed receiving rotor in close proximity to the ground so that the seeds travel but a short distance from said seed pockets to the ground.

4. A seeding device for light weight seeds including a rotatable member, seed receiving means formed in said member, disc means, means on said disc means variable in diameter for adjustably supporting said member in close proximity to the ground, a seed row opening means, means for adjusting the depth to which said seed row opening means may extend, a seed passageway adjacent said seed row opening means leading from said seed receiving means in said rotatable member, means for feeding seed to said rotatable member, and means for rotating said member.

5. A seeder including a pair of inwardly slanting discs, a disc supporting frame, a rotatable seed dropper having a series of seed pockets therein positioned between the rear portion of said discs, said frame having a seed row furrow opener means, and means for rotating said seed dropper.

HUGO C. RASSMANN.